(12) United States Patent  
Kwatra et al.

(10) Patent No.: US 11,552,966 B2
(45) Date of Patent: Jan. 10, 2023

(54) GENERATING AND MUTUALLY MATURING A KNOWLEDGE CORPUS

(71) Applicant: International Business Machines Corporation, Armonk, NY (US)

(72) Inventors: Shikhar Kwatra, Raleigh, NC (US); Adam Lee Griffin, Dubuque, IA (US); Indervir Singh Banipal, Austin, TX (US); Sarbajit K. Rakshit, Kolkata (IN); Laura Grace Ellis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 17/032,006

(22) Filed: Sep. 25, 2020

(65) Prior Publication Data

US 2022/0103574 A1    Mar. 31, 2022

(51) Int. Cl.
*G06F 3/048* (2013.01)
*H04L 9/40* (2022.01)
(Continued)

(52) U.S. Cl.
CPC .......... *H04L 63/1416* (2013.01); *G06F 3/167* (2013.01); *G06F 16/248* (2019.01); *G06N 5/04* (2013.01); *G06N 20/00* (2019.01)

(58) Field of Classification Search
CPC ...... H04L 63/1416; G06N 20/00; G06N 5/04; G06F 16/248; G06F 3/167
See application file for complete search history.

(56) References Cited

U.S. PATENT DOCUMENTS 5,615,296 A     3/1997   Stanford
6,006,218 A *  12/1999   Breese .................. G06F 16/951
                                                 707/999.005
(Continued)

FOREIGN PATENT DOCUMENTS

CN         106601237 A       4/2017
CN         111859139 A   *  10/2020
(Continued)

OTHER PUBLICATIONS

Mell et al., "The NIST Definition of Cloud Computing", NIST, National Institute of Standards and Technology, Special Publication 800-145, Sep. 2011, 7 pages.

*Primary Examiner* — Rashawn N Tillery
(74) *Attorney, Agent, or Firm* — Joseph P. Curcuru

(57) ABSTRACT

In an approach to mature a knowledge corpus using artificial intelligence (AI) and user collaboration, embodiments create, by an AI response system, a knowledge corpus based on retrieved data associated with a first user. Additionally, embodiments execute, by the AI response system, a search to locate one or more matching knowledge corpora based on a request of the first user, and identify, by an anonymous network, at least one cluster of one or more anonymous second users having respective search requests that substantially match the search request of the first user. Furthermore, embodiments execute an AI exchange between the identified one or more anonymous second users and the first user, and mature the knowledge corpus, via the AI response system, based on the AI exchange between the first user and the identified one or more anonymous second users.

20 Claims, 5 Drawing Sheets

(51) Int. Cl.
  *G06N 20/00* (2019.01)
  *G06F 3/16* (2006.01)
  *G06N 5/04* (2006.01)
  *G06F 16/248* (2019.01)

(56) References Cited

U.S. PATENT DOCUMENTS

| | | |
|---|---|---|
| 6,195,641 B1 | 2/2001 | Loring |
| 7,103,542 B2 | 9/2006 | Doyle |
| 7,634,409 B2 | 12/2009 | Kennewick |
| 7,983,911 B2 | 7/2011 | Soufflet |
| 8,214,208 B2 | 7/2012 | Mallett |
| 8,700,396 B1* | 4/2014 | Mengibar ............. G10L 15/063 |
| | | 704/235 |
| 9,646,609 B2 | 5/2017 | Naik |
| 2008/0005264 A1* | 1/2008 | Brunell ............... H04L 63/0407 |
| | | 709/217 |
| 2010/0185650 A1* | 7/2010 | Topatan ................. G06F 16/248 |
| | | 707/769 |
| 2014/0101163 A1* | 4/2014 | Adams ................... G06F 16/951 |
| | | 707/740 |
| 2015/0379087 A1* | 12/2015 | Lee ..................... G06F 16/3329 |
| | | 707/722 |
| 2016/0063599 A1* | 3/2016 | Argue ................. G06Q 30/0631 |
| | | 705/26.7 |
| 2016/0196313 A1* | 7/2016 | Allen .................. G06F 16/3329 |
| | | 707/723 |
| 2018/0300393 A1* | 10/2018 | Brandstetter ...... G06Q 30/0251 |
| 2019/0279618 A1 | 9/2019 | Yadav |
| 2020/0074984 A1* | 3/2020 | Ho .......................... G10L 15/22 |

FOREIGN PATENT DOCUMENTS

| | | |
|---|---|---|
| JP | 2013029684 A * 2/2013 | |
| WO | WO-2005114379 A2 * 12/2005 | ........... G06F 16/335 |

* cited by examiner

GENERATING AND MUTUALLY MATURING A KNOWLEDGE CORPUS

BACKGROUND OF THE INVENTION

The present invention relates generally to the field of artificial intelligence (AI), and more particularly to maturing knowledge corpora.

Knowledge corpus smart spaces are structures that consist of a set of shared resources including data and data processing function, which continuously performs data mining operations for extracting new relevant knowledge and performing routine monitoring functions based on the target functions set by the user or smart space services An intelligent virtual assistant (IVA) or intelligent personal assistant (IPA) is a software agent that can perform tasks or services for an individual based on commands or questions. Sometimes the term "chatbot" is used to refer to virtual assistants generally or specifically accessed by online chat. In some cases, online chat programs are exclusively for entertainment purposes. Some virtual assistants are able to interpret human speech and respond via synthesized voices. Users can ask the IVA's questions, control home automation devices and media playback via voice, and manage other basic tasks such as email, to-do lists, and calendars with verbal or spoken commands. A similar concept; however, with differences, lays under the dialogue systems.

SUMMARY

Embodiments of the present invention disclose a method, a computer program product, and a system for maturing a knowledge corpus using artificial intelligence (AI) and user collaboration, the method comprising: creating, by an AI response system, a knowledge corpus based on retrieved data associated with a first user; executing, by the AI response system, a search to locate one or more matching knowledge corpora based on a request of the first user; identifying, by an anonymous network, at least one cluster of one or more anonymous second users having respective search requests that substantially match the search request of the first user; executing an AI exchange between the identified one or more anonymous second users and the first user; and maturing the knowledge corpus, via the AI response system, based on the AI exchange between the first user and the identified one or more anonymous second users.

DETAILED DESCRIPTION

Figure 1:
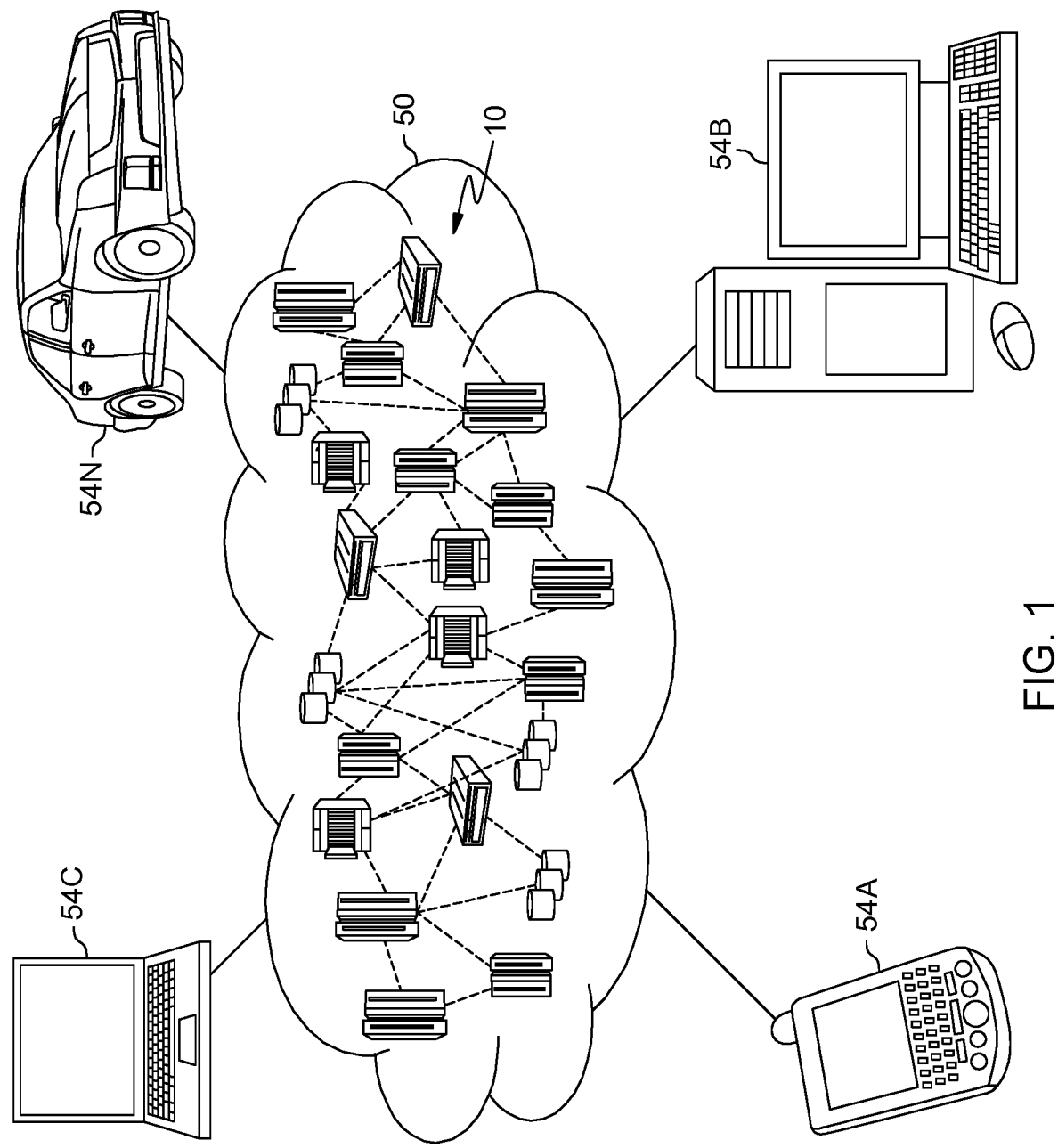
FIG. 1 depicts a cloud computing environment according to an embodiment of the present invention.

Embodiments of the present invention recognize that artificial intelligence (AI) voice response systems (i.e., AI system(s)) create personalized knowledge corpora based on interactions with respective users, wherein an AI system is an intelligent virtual assistant (IVA) or intelligent personal assistant (IPA). A personalized knowledge corpus (i.e., knowledge corpus) references how respective users are executing various use cases in AI systems (e.g., a personalized AI system). Embodiments of the present invention recognize the knowledge corpus is used to fine tune an AI system in order to enhance the AI system's interpretation of data and user interaction experience. For example, learning a user's voice and speech pattern, via natural language processors (NLP's) to better interpret and understand a user's request and/or dialog. Embodiments of the present invention recognize the maturity of a knowledge corpus depends on the duration of the AI voice response use, and the breadth of use cases. Embodiments of the present invention recognize that a large amount of data is typically required to create a functioning knowledge corpus. Embodiments of the present invention recognize that when AI systems are based on the input of only one user, it can take longer for the AI system to be trained.

Additionally, embodiments of the present invention recognize that there are privacy concerns associated with user data. For example, in some cases big data corporations use and sell customer data without notifying the user. Embodiments of the present solves this particular problem by giving the user, the control and freedom, over who can access their data, when their data is accessible, and 'why' their data is being accessed. The 'why' is decided based on what the data will be used for (i.e., the type of request and purpose of accessing the user data). For example, a first user is an avid online shopper for electronic gadgets and the user's preferences are spread out across multiple websites. In this particular example, there is a second user who is an avid e-shopper for clothes. In this example, embodiments of the present invention enable the first user and second user to consent to enter into a barter system where the two users both benefit from the data exchange. The first user's knowledge corpus receives metadata, clothing preferences, and other user data, in relation to clothing, from the second user's knowledge corpus to identify and purchase better clothing and wearables after the first user's knowledge corpus is trained with the classifiers from the second user's knowledge corpus. Similarly, the second user can benefit from the first user's classifiers trained over online electronic items. Resulting in the first user and second user knowing 'where' their accumulated personal data accumulated (i.e., user data) is being shared and 'why'.

Embodiments of the present invention recognize that there is at least the problems, stated above, in the art. Embodiments of the present invention improve the art and solve the particular problems, stated above, by retrieving both historical user data from outside systems (e.g., second user AI systems) and anonymous fit-for-purpose networks (i.e., anonymous network(s)) to share subsets of the knowledge corpus data and by executing and coordinating multiple application (multi-app) and multiple-user (multi-user) collaboration to enable one or more AI systems to mature more efficiently. A multi-user collaboration is a collaboration comprising two or more users.

Embodiments of the present invention solve the particular problems, stated above by ensuring that user's voice response data is not used in any other systems without the user's full knowledge and approval. Through system integrations, embodiments of the present invention enable the user the option to leverage the user's existing knowledge corpus from tools like search engines or social media tools to further train the knowledge corpus. For instance, the user has a virtual reality (VR) system that is paired with or has a built in AI system. In this example, embodiments of the present invention prevent the user's data from being shared outside of the user's own personal VR system. Through anonymous fit-for-purpose clusters (i.e., anonymous network(s)), the users are given the option to anonymously exchange portions of their data with the VR systems of users in the same cluster. To participate in the user data exchange in the anonymous cluster (i.e., anonymous data exchange) the user must select to "opt in." During the anonymous data exchange the data is anonymized and not shared with the end VR users in its raw format.

Implementation of embodiments of the invention may take a variety of forms, and exemplary implementation details are discussed subsequently with reference to the Figures (i.e., FIG. 1-FIG. 5.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to Figure (FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
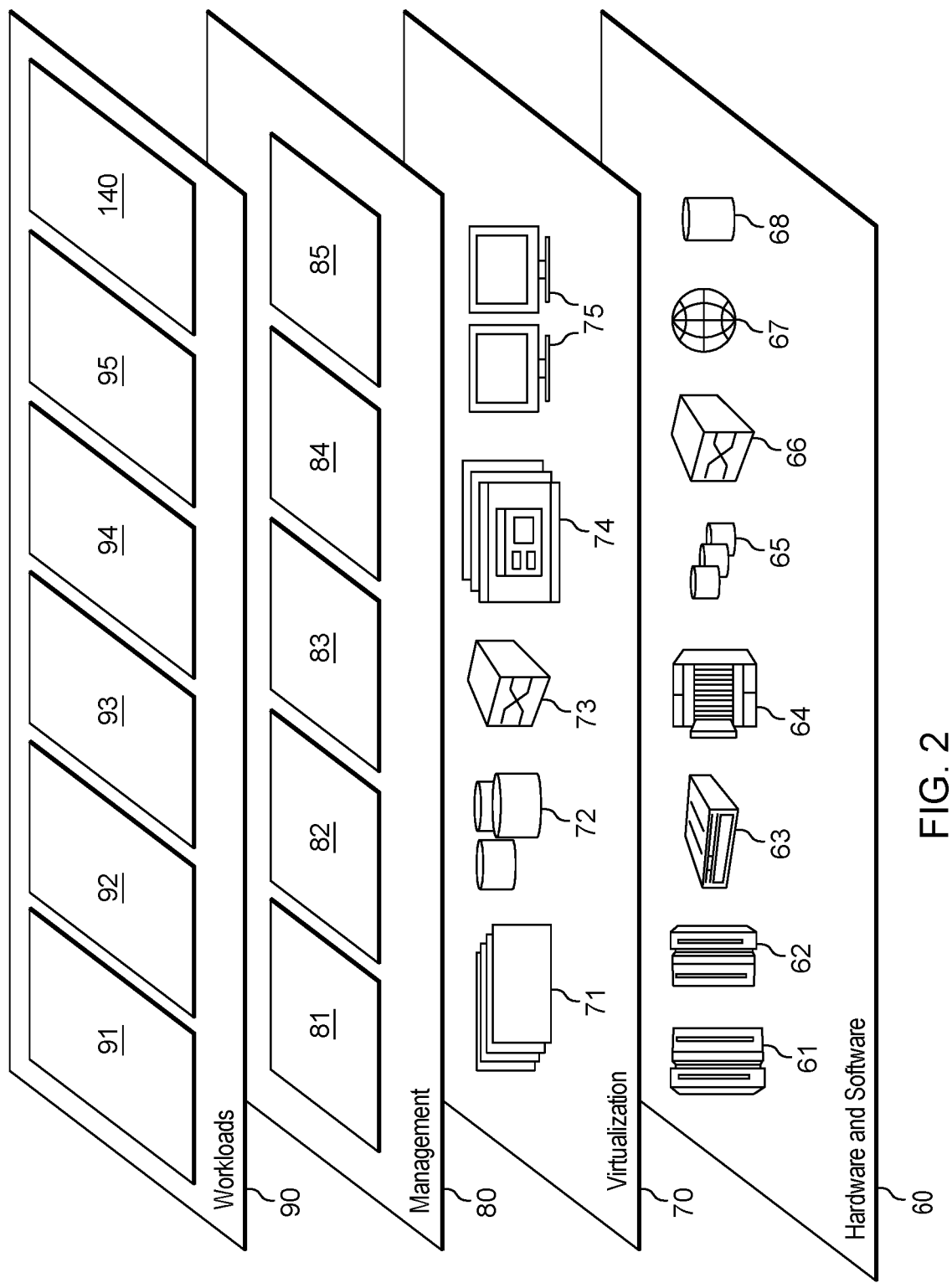
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68 which can be an identity management application (e.g., VMM). It should be noted that the term "database software 68" can herein be used interchangeably with "identity management application 68".

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and workload orchestrating (orchestrating) component 140.

Figure 3:
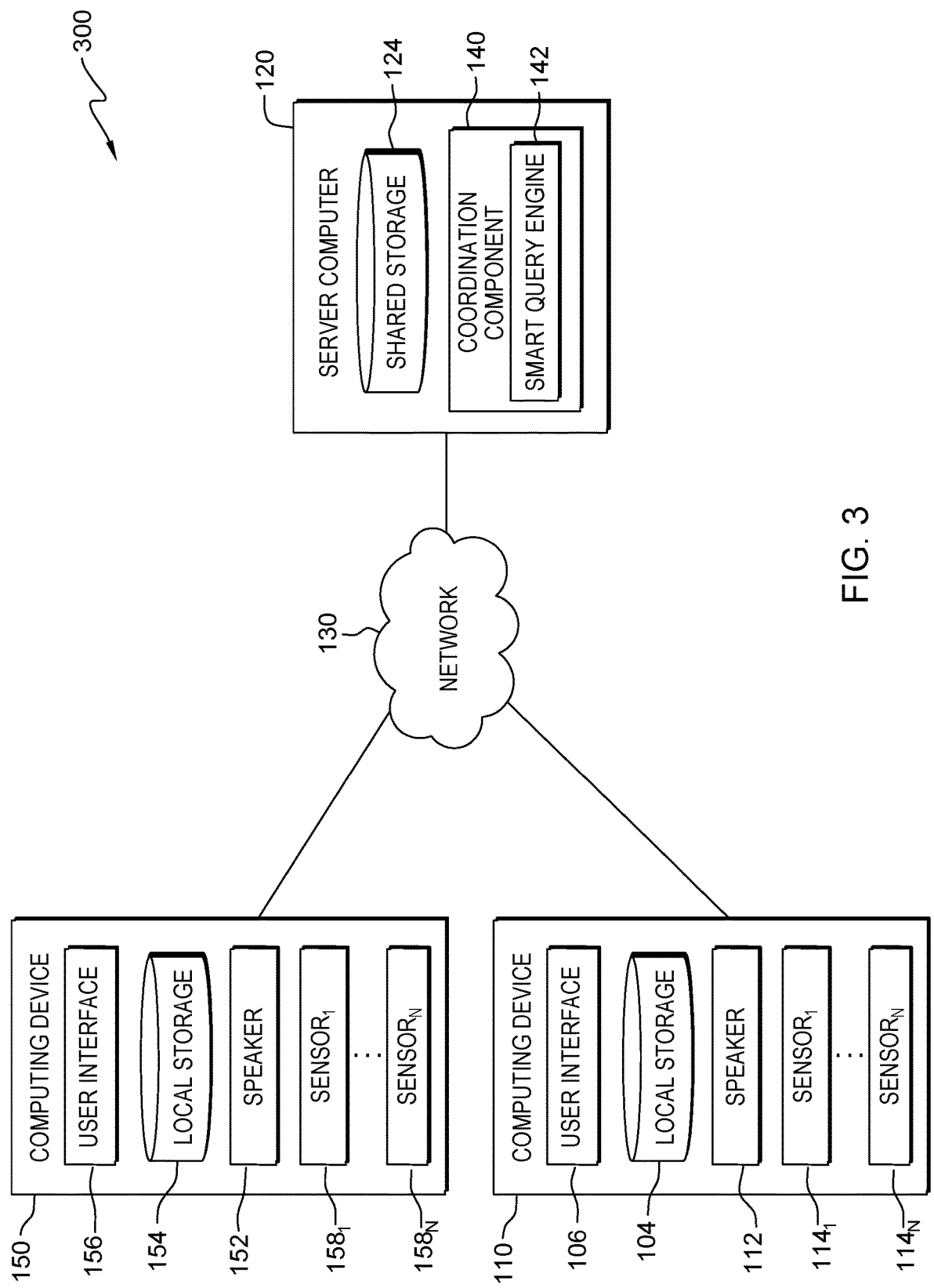
FIG. 3 is a functional block diagram illustrating a distributed data processing environment, in accordance with an embodiment of the present invention.

FIG. 3 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, computing device 150, and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110, server computer 120, and any other computing devices, server computers, and/or storage devices (not shown in FIG. 3) within distributed data processing environment 100.

In some embodiments of the present invention, computing device 110 and computing device 150 may each be, but are not limited to, a standalone device, a client, a server, a laptop computer, a tablet computer, a netbook computer, a personal computer (PC), a smart phone, a desktop computer, a smart television, a smart watch, a radio, a stereo system, an artificial intelligence (AI) voice response systems (i.e., AI system), an intelligent virtual assistant (IVA) or intelligent personal assistant (IPA), AR glasses, a virtual reality headset, an internet of things (IoT) device, any HUD known in the art, and/or any programmable electronic computing device capable of communicating with various components and devices within distributed data processing environment 100, via network 130 or any combination therein. In general, computing device 110 and computing device 150 may each be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 and computing device 150 may each represent a plurality of computing devices.

In some embodiments of the present invention, computing device 110 and computing device 150 may each represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, local storage 104, speaker 112, and sensor $114_{1-N}$. Computing device 150 may include an instance of user interface (interface) 156, local storage 154, speaker 152, and sensor $158_{1-N}$ In various embodiments, not depicted in FIG. 3, computing device 110 and computing device 150 may each have a plurality of user interfaces. In other embodiments, not depicted in FIG. 3, distributed data processing environment 100 may comprise a plurality of computing devices, plurality of server computers, and/or one a plurality of networks. Computing device 110 and computing device 150 may each include internal and external hardware components, as depicted, and described in further detail with respect to FIG. 6.

Interface 106 and interface 156 each provide an interface to the computing device 110 and computing device 150. Interface 106 and interface 156 may each enable a user and/or a client to interact with coordination component 140 and/or server computer 120 in various ways, such as sending program instructions, receiving program instructions, sending and/or receiving messages, updating data, sending data, inputting data, editing data, collecting data, and/or receiving data. In one embodiment, interface 106 and interface 156 may each be a graphical user interface (GUI) or a web user interface (WUI) and may display at least text, documents, web browser windows, user options, application interfaces, and instructions for operation. Interface 106 and interface 156 may each include data (such as graphic, text, and sound) presented to a user and control sequences the user employs to control operations. In another embodiment, interface 106 and interface 156 may each be a mobile application software providing an interface between a user of computing device 110, computing device 150 and/or server computer 120, respectively. Mobile application software, or an "app," may be designed to run on smart phones, tablet computers and other computing devices. In an embodiment, interface 106 and interface 156 may each enable the user of computing device 110 to at least send data, input data, edit data (annotations), collect data and/or receive data.

Server computer 120 be a standalone computing device, a management server, a web server, a mobile computing device, one or more client servers, or any other electronic device or computing system capable of receiving, sending, and processing data. In other embodiments, server computer 120 represent a server computing system utilizing multiple computers such as, but not limited to, a server system, such as in a cloud computing environment. In another embodiment, server computer 120 represent a computing system utilizing clustered computers and components (e.g., database server computers, application server computers, etc.) that act as a single pool of seamless resources when accessed within distributed data processing environment 100. Server computer 120 include internal and external hardware components, as depicted, and described in further detail with respect to FIG. 6. In some embodiments of the present invention, server computer 120 represent a plurality of server computers.

Each of shared storage 124, local storage 154, and local storage 104 may be a data/knowledge repository and/or a database that may be written and/or read by one or a combination of coordination component 140, server computer 120, computing device 150, and computing device 110. In the depicted embodiment, shared storage 124 resides on server computer 120, local storage 154 resides on computing device 150, and local storage 104 resides on computing device 110. In another embodiment, shared storage 124, local storage 154, and/or local storage 104 may reside elsewhere within distributed data processing environment 100, provided that each may access and is accessible by computing device 110, computing device 150, and/or server computer 120. Shared storage 124, local storage 154, and/or local storage 104 may each be implemented with any type of storage device capable of storing data and configuration files that may be accessed and utilized by server computer 120, such as, but not limited to, a database server, a hard disk drive, or a flash memory.

In some embodiments of the present invention, shared storage 124, local storage 154, and/or local storage 104 may each be a hard drive, a memory card, a computer output to laser disc (cold storage), and/or any form of data storage known in the art. In some embodiments, shared storage 124, local storage 154, and/or local storage 104 may each be one or more cloud storage systems and/or databases linked to a cloud network. In various embodiments, shared storage 124, local storage 154, and/or local storage 104 may access, store, and/or house user data, physical room data, and meeting data, and/or data shared throughout distributed data processing environment 100.

Speaker 112 and speaker 152 may each be any type of speaker known in the art. Speaker 112 and speaker 152 may each be an electroacoustic transducer; a device which converts an electrical audio signal into a corresponding sound. Speaker 112 and speaker 152 each produce and distribute sound to one or more users. In various embodiments of the present invention, speaker 112 and speaker 152 may each output requests, responses, and/or instructions (i.e., user interactions with an IVA), wherein coordination component 140 receives the audio output from speaker 112 and/or speaker 152 and processes it through an NPL and stores the metadata from the user interaction with computing device 110 and/or computing device 150 as user preferences and user data on local storage 104, local storage 154, and/or shared storage 124.

A sensor is a device that detects or measures a physical property and then records or otherwise responds to that property, such as vibration, chemicals, radio frequencies, environment, weather, humidity, light, etc. Sensor $114_{1-N}$ and sensor $158_{1-N}$, herein sensor(s) 114 and sensor(s) 158, detect a plurality of attributes of a user of notification adjustment application 112 and of the environment of the user. As used herein, N represents a positive integer, and accordingly the number of scenarios implemented in a given embodiment of the present invention is not limited to those depicted in FIG. 1. Sensor(s) 114 and sensor(s) 158 may be one or more of a plurality of types of camera, including, but not limited to, pin-hole, stereo, omni-directional, non-central, infrared, video, digital, three dimensional, panoramic, filter-based, wide-field, narrow-field, telescopic, microscopic, etc.

In some embodiments, sensor(s) 114 and sensor(s) 158 include any device capable of imaging a portion of the electromagnetic spectrum. If client computing device 110 is a wearable device, then sensor(s) 114 may include biometric sensors for detecting the physical condition of the user, such as blood pressure, heart rate, respiratory rate, calories burned, calories consumed, pulse, oxygen levels, blood oxygen level, glucose level, blood pH level, salinity of user perspiration, skin temperature, galvanic skin response, electrocardiography data, body temperature, eye tracking data, etc. Sensor(s) 114 and sensor(s) 158 may be one or more of a plurality of types of microphone for detecting speech and other audible sounds, such as a voice command. Sensor(s) 114 and sensor(s) 158 may each register sound, such as user produced audio, and relays the registered sound/audio to an NPL. In various embodiments of the present invention, sensor(s) 114 and sensor(s) 158 may each receive requests and/or instructions (i.e., audio input) from a user, wherein coordination component 140 receives the audio input from the sensor(s) 114 and sensor(s) 158 and processes it through an NPL and stores the metadata from the audio input as user preferences and user data on local storage 104, local storage 154, and/or shared storage 124. Sensor(s) 114 and sensor(s) 158 may be one or more of a plurality of types of gyroscopic sensors that can detect movement. Sensor(s) 114 and sensor(s) 158 may be one or more of a plurality of types of pressure sensors. Sensor(s) 114 and sensor(s) 158 may be global positioning system (GPS) sensors. Sensor(s) 114 and/or sensor(s) 158 may be integrated into the vehicle of the user.

In the depicted embodiment, coordination component 140 executes on server computer 120. In other embodiments, coordination component 140 may be executed on computing device 110. In various embodiments of the present invention, not depicted in FIG. 3, coordination component 140 may execute on a plurality of server computers 120, a plurality of computing devices 110, and/or a plurality of computing device 150. In some embodiments, coordination component 140 may be located and/or executed anywhere within distributed data processing environment 100 as long as coordination component 140 is connected to and/or communicates with smart query engine 142, computing device 110, computing device 150 and/or server computer 120, via network 130.

In the depicted embodiment, smart query engine 142 executes on server computer 120. In other embodiments, smart query engine 142 may be executed on computing device 110. In various embodiments of the present invention, not depicted in FIG. 3, smart query engine 142 may execute on a plurality of server computers 120, a plurality of computing devices 110, and/or a plurality of computing device 150. In some embodiments, smart query engine 142 may be located and/or executed anywhere within distributed data processing environment 100 as long as smart query engine 142 is connected to and/or communicates with coordination component 140, computing device 110, computing device 150, and/or server computer 120, via network 130.

In various embodiments of the present invention, coordination component 140 boosts one or more knowledge corpus through software integrations. For example, a user can opt-in (i.e., agree) to integrate one or more social media profiles and browser search interactions (e.g., history, search terms, bookmarks, cookies, and metadata) to supplement a personal knowledge corpus by including data from the user's historical interactions with other systems. In this particular example, coordination component 140 enables the AI system (i.e., computing device 110 and/or computing device 150) to integrate with social media-based tools to generate and mature the knowledge corpus around the user's natural speech patterns. For example, coordination component 140 collects, processes, and stores user data (e.g., posts, likes, comments, preferences, locations, etc.) from the integrated social media-based tools. In various embodiments of the present invention, coordination component 140 integrates computing device 110 and/or computing device 150 with search-based tools (e.g., web crawling tools, search engines, and/or libraries capable of crawling through the web and identifying information/data that can be used to mature the knowledge corpus) to mature a personalize knowledge corpus around the user's search focused language patterns. It should be noted that a personal knowledge corpus is the same as a knowledge corpus and a user's knowledge corpus.

In various embodiments of the present invention, coordination component 140 generate and mature a personalized knowledge corpus for a user using deep learning framework, natural language processors (NLPs), natural-language understanding (NLU) neural network, and/or one or more cognitive toolkits. In various embodiments of the present invention, coordination component 140 boosts one or more knowledge corpus through anonymous networks. For example, if a user wants to mature a personalized knowledge corpus through an IVA, then the user can submit a voice request, via the microphone on the IVA, to "opt-in" to an anonymous knowledge corpus sharing. In this particular example, coordination component 140 confirms the user's selection to "opt-in" by issuing an auditory notification through the speaker of the IVA. In this particular example, based on how the user is using computing device 110 and/or computing device 150, computing device 110 and/or computing device 150 may select a large group of similar anonymous users through a K Means clustering algorithm (as it is understood in the art). An auditory notification can be a pre-determined or pre-record response that is a verbal or auditory notification issued to the user via speaker 112, speaker 152, interface 106, and/or interface 156 (e.g., speaker and/or display screen).

Coordination component 140 may expand the matching recurrent neural network (RNN) algorithm anonymously to an entire user base that enables computing device 110 and/or computing device 150 to select similar matches, wherein the user base is a database comprising users who have selected to "opt-in" to the user base (i.e., anonymous network) In various embodiments of the present invention, the selected matches (i.e., similar matches) will help to boost the success of the knowledge corpus maturing, increase the efficiency of knowledge corpus maturing, and reduce the noise of outliers. The participation of these anonymous networks increases the effectiveness and accuracy of an individual user's AI system results and increase the performance of the whole network. The nodes in the anonymous network may contribute and benefit from the performance of their shared corpus. The performance of the network increases when the other user's system is able to accurately benefit from the information being shared and reduces the latency in information being shared and provisioned across the anonymous network.

Computing device 110 and/or computing device 150, via coordination component 140, may match users to a variety of clusters to fine tune targeted areas of the knowledge corpus. For example, the AI system, via coordination component 140, adds the user to a speech accent cluster to further supplement the knowledge corpus of similar accents. Additional types of corpus clusters included but are not limited to: language style/slang clusters, use case driven clusters (i.e. online shoppers, music lovers, list driven users etc.). The AI system, via coordination component 140, may monitor the fit of the user in each matched cluster over time and may automatically adjust them to new clusters based on the analysis of the collected and/or monitored user data from user interactions with computing device 110 and/or computing device 150. For example, the user may expand into new use cases for the AI system such as device control. In this case the user would be matched with an additional cluster to boost accuracy of device control interactions. In various embodiments of the present invention, coordination component 140 retrieves and/or stores user-based interactions with computing device 110 and/or computing device 150 (i.e., user interactions with AI systems) from local storage 104 and/or shared storage 124.

In some embodiments of the present invention, coordination component 140 retrieves and/or receives user interactions in real-time and stores the retrieved and/or received user interaction on local storage 104 and/or shared storage 124. Retrieving and/or receiving real-time user interaction data may comprise receiving user dialog from sensor $114_{1-N}$ and sensor $158_{1-N}$ (e.g., microphone) and/or a transcript or text data of the user's dialog from a deep learning framework, natural language processor (NLP), natural-language understanding (NLU) neural network, and/or one or more cognitive toolkits, wherein the user dialog and/or user text data is input is received via interface 106, interface 156, sensor $114_{1-N}$ and/or sensor $158_{1-N}$. In some embodiments of the present invention, if coordination component 140 is having difficulty understanding (i.e., registering) a user's voice command and/or request then after a predetermined amount of attempts coordination component 140 displays a responsive notification on interface 106 or interface 156 or executes a predetermined auditory notification, via speaker 112 and/or speaker 152, asking the user to clarify the command or request. The responsive notification depicts what coordination component 140 registered from the user's command or request and enables the user to manually correct it through interface 106 or interface 156 (e.g., digital keyboard or voice dictation). In various embodiments of the present invention, coordination component 140 collects user data to build a knowledge corpus through, but not limited to, NLPs, NLUs, deep learning framework, speaker 112, speaker 152, sensor(s) 114, sensor(s) 158, user search history, user learn preferences, and/or user set preferences.

In various embodiments of the present invention, coordination component 140 identifies a trading party (i.e., one or more second users/second parties) with mutually beneficial user data exchange (i.e., AI exchange), via smart query engine 142, that enables users to connect with each other based on which substantially matching party can provide a mutually beneficial AI exchange. The smart query engine 142 may consider, but not limited to, the following things: availability of AI data desired by the user, and the amount and quality of AI data a user wants, wherein the desired AI data is user data (user preferences, metadata, etc.) collected by computing device 110 and computing device 150. In various embodiments of the present invention, coordination component 140 determines if the selected trading party is secure.

For example, there is a party (e.g., an opposing party) willing to provide a plurality of different domains of AI data. In this particular example, through social engineering attacks or phishing, the user is very easily lured into a deal. In this example, the opposing party is a subsidiary business which sells user data to some third party. In this example, coordination component 140, via smart query engine 142, displays a safety rating to the user of one or more interested parties (e.g., opposing parties, third parties, etc.) in order to alert the user of a potential security threat. Coordination component 140 may detect and alert a user of a potential security threat by calculating a safety rating score that is determined based on respective safety ratings of one or more interested parties. Coordination component 140 may issue one or more notifications to a user when the user selects a trading party that has a calculated safety rating score below a predetermined threshold. Coordination component 140 may flag a user as a safety concern and/or issue one or more notifications to user that may interact with a user that is a potential threat.

In various embodiments of the present invention, coordination component 140 can issue a prompt or notification to the user, via speaker 112, speaker 152, interface 106, and/or interface 156, to warn the user of a potential security threat of an interested second party. For example, if a first user selects a second user to mutually exchange user data and/or AI data and the second user has one or more flagged safety concerns, then coordination component will issue a predetermined statement and/or notification to the user, speaker 112, speaker 152, interface 106, and/or interface 156 (e.g., speaker and/or display screen).

Coordination component 140 may generate feedback through crowd security and determine if a trading party is trustworthy. For example, after the AI exchange is done, the users will have the option to review the historical AI exchange between them and the trading party. In this example, after reviewing the historical AI data exchange, the user realizes the data was given to a party disguised as a trustworthy party (e.g., a third-party company that sells user data to the large corporations for user data mining). In this example, coordination component enables the user to provide feedback on the user's experience with the exchanging party and enable the user to flag and rate (e.g., assign safety ratings) the exchanging party. The safety ratings assigned by the users in regard to the exchanging party may be shared by the users after the interaction with the exchanging party is complete.

In various embodiments of the present invention, before entering an AI exchange the user should have an established knowledge corpus in one or more domains so the user data is marketable to other genuine parties. Coordination component 140 may generate a marketing index for a user based on a combination of number of AI domains and knowledge corpus the user has, the quality of the corpus, and the user's willingness to share AI data that with other parties. The health/quality calculations and scoring for a knowledge corpus a predetermined. In various embodiments of the present invention, coordination component 140 comprises a configurable security of a knowledge corpus on the domain level. Coordination component 140 enables a user the freedom to selectively manage different knowledge corpora. For example, an end user desires to make the clothing preferences on the user's knowledge corpus available through an AI exchange on the anonymous network but desires to hide the electronics knowledge and preferences from the AI exchange. In this particular example, the user selects to selectively hide the electronics' data from interested parties and selects to enable second party access to the clothing preferences, via interface 106 or interface 156. A user can selectively manage user preferences by opting "in" or "out" of sharing each preference, via interface 106.

While maturing a knowledge corpus in a collaborative manner, the participating users can specify the topic to be considered for collaborative knowledge corpus creation and maturing. For example, the participating AI system will collaborate with each other and executing various use cases among each other to identify different types of new scenarios, and accordingly the participating AI systems will mature the knowledge corpus of each other with the different types of scenarios. The participating AI system may receive required permission from the respective participating users and accordingly knowledge corpus may mature gradually for the defined topic. In various embodiments of the present invention, coordination component 140 mutually matures a plurality of knowledge corpora.

Through AI market exchange, coordination component 140 enables users to market the personalize knowledge corpus each user has created/developed or enables users to purchase other users personalized knowledge corpus. For example, a user's music knowledge corpus. The AI market exchange is an explicit opt in process where the user has to proactively market or purchase a knowledge corpus.

Figure 4:
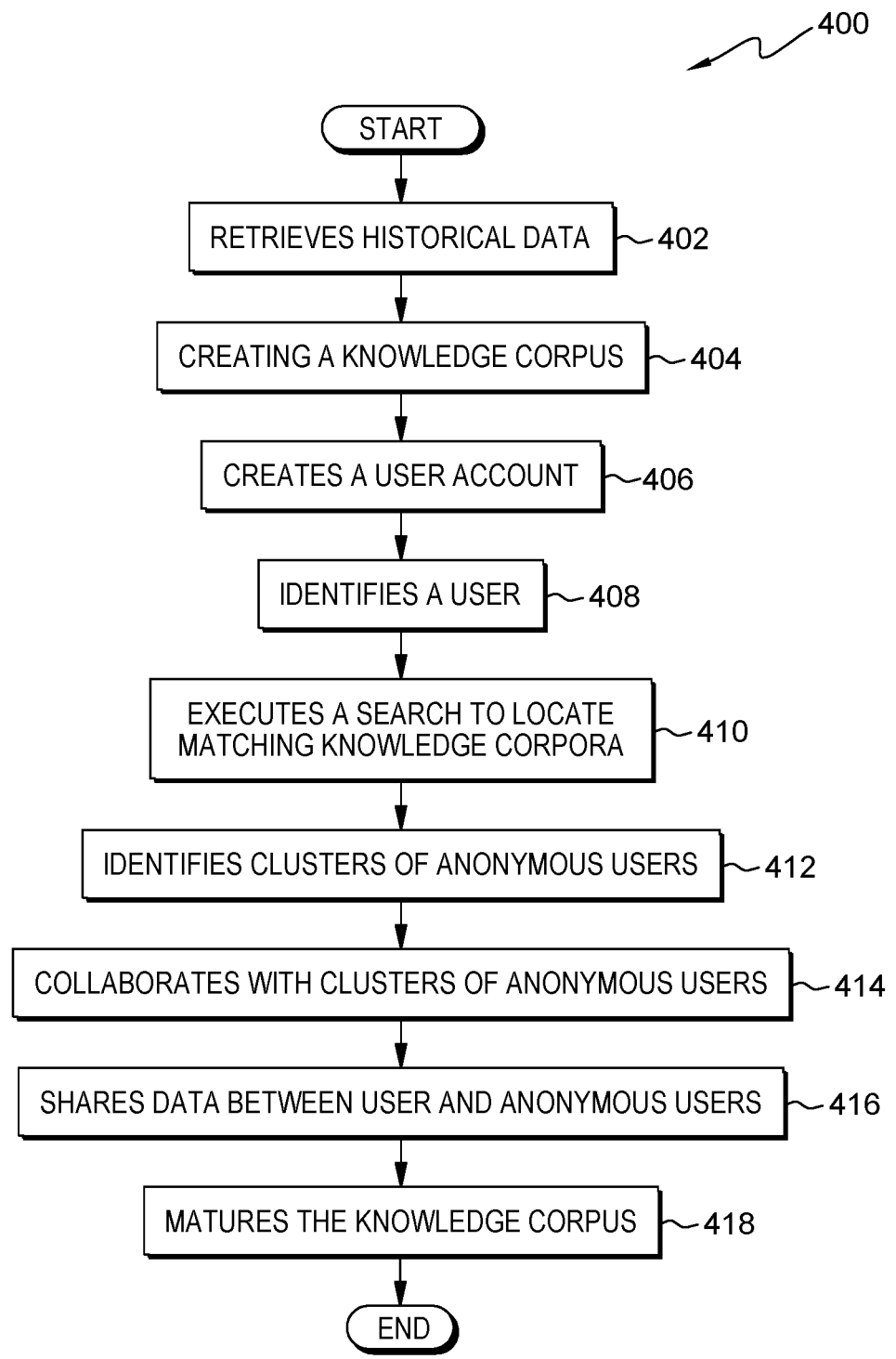
FIG. 4 illustrates operational steps of the coordination component, on the server computer within the distributed data processing environment of FIG. 3, for maturing a knowledge corpus using AI, in accordance with an embodiment of the present invention.

FIG. 4 illustrates operational steps coordination component 140, generally designated 400, in communication with computing device 110 and/or server computer 120, within distributed data processing environment 100 of FIG. 3, for maturing a knowledge corpus using AI, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, coordination component 140 retrieves historical AI system usage data from computing device 110 and/or computing device 150. In various embodiments of the present invention, each AI based voice response system is connected to a cloud server based on a user's account. Coordination component 140 may store an individual knowledge corpus in a remote cloud server, using historical learning of AI system usage data.

In step 404, coordination component 140 creates a knowledge corpus. In various embodiments of the present invention, coordination component 140, via machine learning, creates a collection of user specific knowledge corpora based on a user's historical usage pattern. When the knowledge corpus is created, the AI system may use the usage pattern of the user. So, the maturity level of the knowledge corpus and use case coverage of the knowledge corpus may be different for different users and/or tailored for a specific user. A user can select to enable coordination component 140 to access the user's personal social media accounts/social media data and browser search data to boost the user's knowledge corpus.

In step 406 coordination component 140 creates a user account. In various embodiments of the present invention, coordination component 140 creates and/or modifies a user account associated with the AI system, wherein the user can define if the user is willing to anonymously collaborate with other users to mature the user's personal knowledge corpus. A user may also "opt-out" of specific areas of knowledge corpus sharing. For example, a user may not want to share the home cooking knowledge corpus with anyone. A user may also opt out from collaboration.

In step 408 coordination component 140 identifies a user. In various embodiments of the present invention, coordination component 140 uniquely identifies the user of any AI system. Coordination component 140 may uniquely identify a user based on voice recognition, speech pattern, an authorization code (that may be vocalized to the AI system), and/or any other unique identifier techniques known in the art.

In step 410, coordination component 140 executes a search to locate matching knowledge corpora. In various embodiments of the present invention, coordination component 140 searches a database of anonymous users who have agreed to share data with other user that match a user's particular data request to efficiently mature the user's knowledge corpus. For example, if a user wants to mature the knowledge corpus regarding home automation and power savings, then the user asks the AI system to search for matches to collaborate with, wherein coordination component 140 searches through a plurality of anonymous clusters for users who may have a rated and/or identified to have knowledge and/or expertise in home automation and power savings. Topic examples can include but are not limited to: controlling a lighting system, controlling home appliances, controlling music system, and sharing cooking knowledge.

In step 412, coordination component 140 identifies clusters of anonymous users in a database. In various embodiments of the present invention, coordination component 140 identifies at least one cluster of one or more anonymous users from one or more databases. Continuing the example above, when the user asks the voice response system about the possible collaboration with other users to mature the knowledge corpus, then AI system will identify clusters of anonymous users that have substantially similar search requests or fit-for-purpose corpus profiles which are similar in nature, similar in topic, and similar clusters to the user, so that the AI systems can collaborate with each other to share knowledge corpus.

Coordination component 140 may identify a substantially similar match between two or more user's whose data request compliments/satisfies each other's data search. For example, a first user is an avid online shopper for electronic gadgets and the user's preferences are spread out across multiple websites. In this particular example, there is a second user who is an avid e-shopper for clothes. In this example, embodiments of the present invention enable the first user and second user to consent to enter into a barter system through computing device 110 and computing device 150 where the two users both benefit from the data exchange. The first user's knowledge corpus receives metadata, clothing preferences, and other user data, in relation to clothing, from the second user's knowledge corpus to identify and purchase better clothing and wearables after the first user's knowledge corpus is trained with the classifiers from the second user's knowledge corpus. Similarly, the second user can benefit from the first user's classifiers trained over online electronic items.

In step 414, coordination component 140 collaborates with clusters of anonymous users. In various embodiments of the present invention, coordination component 140 collaborates with one or more of the identified clusters of anonymous users. Continuing the example above, the participating AI system will begin collaborating with each other and will validate the type of use cases that can be executed by each AI system, and will identify which scenarios are common and which are new. Coordination component may execute an AI exchange between the identified anonymous second users and the first user based on the available knowledge corpus or portions of a knowledge corpus selected by the first and second user.

In step 416, coordination component 140 shares data of the created scenarios. In various embodiments of the present invention, coordination component 140 creates scenarios and shares the data with other devices. For example, the new scenarios will be shared with other devices, in this case raw data for creating those scenarios are shared. Scenarios may occur wherein similar commands are being asked and executed by the AI system. The user might ask about the varying levels of vegetable harvest in a particular region and may request, via computing device 110 and/or computing device 150, for another anonymized cluster to request or present additional information about a particular vegetable in the harvest, wherein another anonymized cluster provides insight on this particular topic based on interaction with the users existing within the anonymous network. Similarly, some simulated scenarios can be created based on similarity of questions or interjections that can be provided from the users within the anonymous network to be inquired from the AI system, which may be personalized information which assists in the maturing of the knowledge corpus on one particular computing device (e.g., computing device 110 and/or computing device 150). If other devices are being engaged in similar questions within the network, the information from the current AI system, will actively collaborate to share the matured data across the anonymous network to indicate the seamless flow of information and knowledge sharing across the environment (e.g., anonymous network).

In step 418, coordination component 140 matures the knowledge corpus through user collaboration. In various embodiments of the present invention, coordination component 140 retrieves and stores the data exchanged by the users involved in the collaboration from computing device 110 and/or computing device 150. In various embodiments of the present invention, gradually computing device 110 and/or computing device 150 may collaborate with each other enabling the knowledge corpus to mature based on the user's mutual collaboration.

Figure 5:
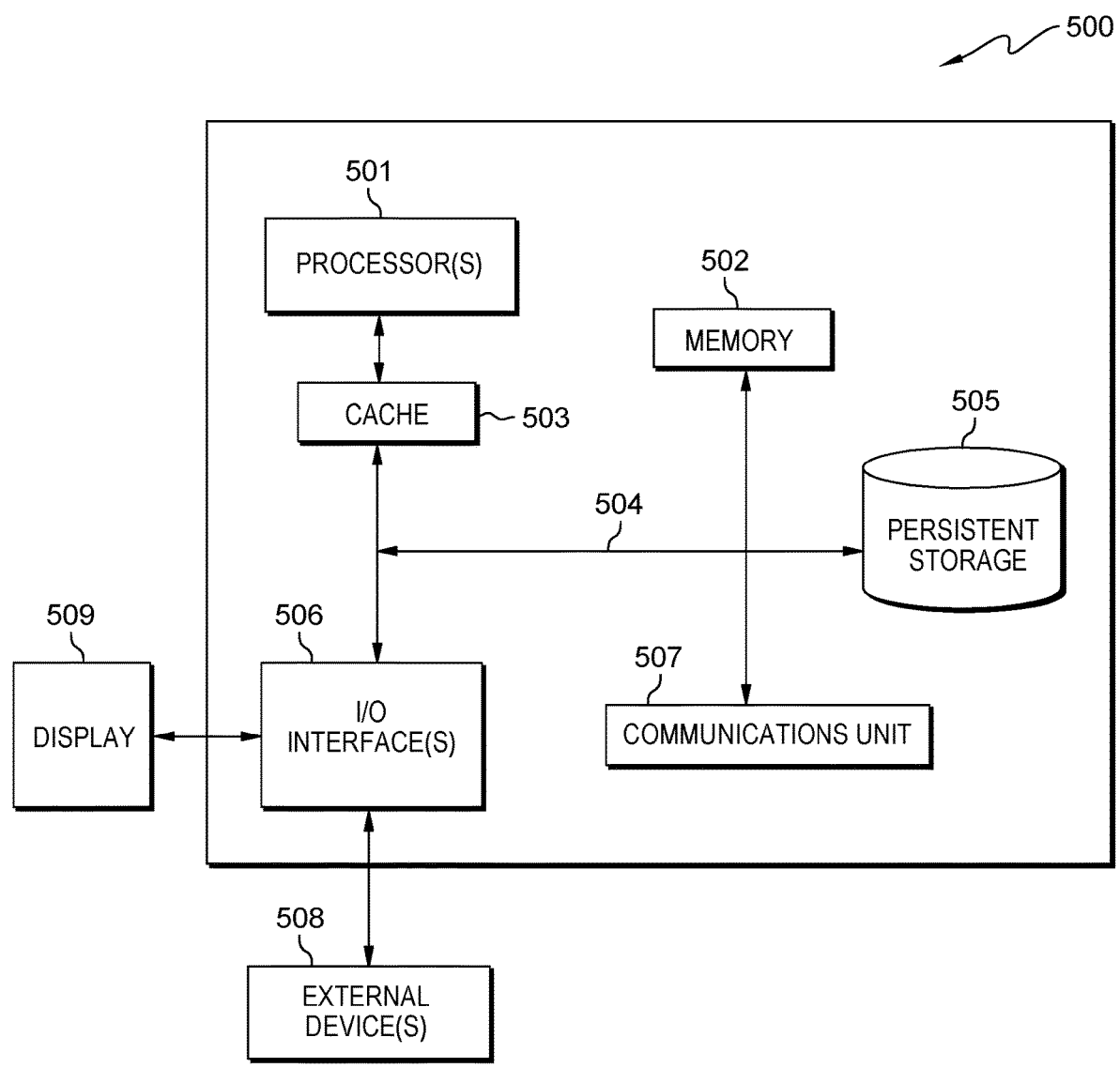
FIG. 5 depicts a block diagram of components of the server computer executing the coordination component within the distributed data processing environment of FIG. 3, in accordance with an embodiment of the present invention.

FIG. 5 depicts a block diagram of components of server computer 120 within distributed data processing environment 100 of FIG. 3, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 depicts computer system 500, where server computer 120 represents an example of computer system 500 that includes coordination component 140. The computer system includes processors 501, cache 503, memory 502, persistent storage 505, communications unit 507, input/output (I/O) interface(s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 may be implemented with any architecture designed for passing data and/or control information between processors (such as microprocessors, communications, and network processors, etc.), system memory, peripheral devices, and any other hardware components within a system. For example, communications fabric 504 may be implemented with one or more buses or a crossbar switch.

Memory 502 and persistent storage 505 are computer readable storage media. In this embodiment, memory 502 includes random access memory (RAM). In general, memory 502 may include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 enables for input and output of data with other devices that may be connected to each computer system. For example, I/O interface 506 may provide a connection to external devices 508 such as a keyboard, keypad, a touch screen, and/or some other suitable input device. External devices 508 may also include portable computer readable storage media such as, for example, thumb drives, portable optical or magnetic disks, and memory cards. Software and data used to practice embodiments of the present invention may be stored on such portable computer readable storage media and may be loaded onto persistent storage 505 via I/O interface(s) 506. PO interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for maturing a knowledge corpus using artificial intelligence (AI) and user collaboration, the method comprising:

creating, by an AI response system, a knowledge corpus based on retrieved data associated with a first user;

executing, by the AI response system, a search to locate one or more matching knowledge corpora based on a request of the first user;

identifying, by an anonymous network, at least one cluster of one or more anonymous second users having respective search requests that substantially match the search request of the first user;

executing an AI exchange between the identified one or more anonymous second users and the first user; and maturing the knowledge corpus, via the AI response system, based on the AI exchange between the first user and the identified one or more anonymous second users.

2. The method of claim 1, further comprising:
receiving, by a user interface or microphone, user dialog or user text data input; and
receiving real-time user interaction data, wherein receiving the real-time user interaction data comprises: receiving user dialog from a microphone, or a transcript or text data of a dialog of a user from at least one of: a deep learning framework, a natural language processor (NLP), a natural-language understanding (NLU) neural network, and one or more cognitive toolkits.

3. The method of claim 1, further comprising:
responsive to having difficulty registering a voice command or request of the first user, displaying, by a user interface, or providing an auditory notification by a speaker, a responsive notification to the first user that prompts the first user to clarify the voice command or request of the first user, wherein the responsive notification identifies the voice command or request of the first user and enables the first user to correct the voice command in the responsive notification through the user interface, or a microphone via voice dictation.

4. The method of claim 1, further comprising:
determining a selected trading party is secure, wherein the determining the selected trading party is secure comprises:
displaying, by a smart query engine, a safety rating of one or more interested trading parties to the first user to alert the first user of a potential security threat.

5. The method of claim 1, further comprising:
alerting the first user of a potential security threat by calculating a safety rating score based on respective safety ratings of one or more interested parties; and
issuing one or more notifications to the first user when the first user selects a trading party that has a calculated safety rating score below a predetermined threshold.

6. The method of claim 1, further comprising:
enabling the first user to selectively manage one or more knowledge corpora, wherein the first user can select to enable access to at least a portion of the knowledge corpus of the one or more knowledge corpora for AI exchange through the anonymous network.

7. The method of claim 1, further comprising:
retrieving historical user data of the first user from a database; and
creating a user account for the first user based on the retrieved historical user data and interactions of the first user with the AI response system.

8. A computer system for maturing a knowledge corpus using artificial intelligence (AI) and user collaboration, the computer system comprising:
one or more computer processors;
one or more computer readable storage devices;
program instructions stored on the one or more computer readable storage devices for execution by at least one of the one or more computer processors, the stored program instructions comprising:
program instructions to create, by an AI response system, a knowledge corpus based on retrieved data associated with a first user;
program instructions to execute, by the AI response system, a search to locate one or more matching knowledge corpora based on a request of the first user;
program instructions to identify, by an anonymous network, at least one cluster of one or more anonymous second users having respective search requests that substantially match the search request of the first user;
program instructions to execute an AI exchange between the identified one or more anonymous second users and the first user; and
program instructions to mature the knowledge corpus, via the AI response system, based on the AI exchange between the first user and the identified one or more anonymous second users.

9. The computer system of claim 8, further comprising:
program instructions to receive, by a user interface or microphone, user dialog or user text data input; and
program instructions to receive real-time user interaction data, wherein receiving the real-time user interaction data comprises: receiving user dialog from a microphone, or a transcript or text data of a dialog of a user from at least one of: a deep learning framework, a natural language processor (NLP), a natural-language understanding (NLU) neural network, and one or more cognitive toolkits.

10. The computer system of claim 8, further comprising:
responsive to having difficulty registering a voice command or request of the first user, program instructions to display, by a user interface, or providing an auditory notification by a speaker, a responsive notification to the first user that prompts the first user to clarify the voice command or request of the first user, wherein the responsive notification identifies the voice command or request of the first user and enables the first user to correct the voice command in the responsive notification through the user interface, or a microphone via voice dictation.

11. The computer system of claim 8, further comprising:
program instructions to determine a selected trading party is secure, wherein the determining the selected trading party is secure comprises:
program instructions to display, by a smart query engine, a safety rating of one or more interested trading parties to the first user to alert the first user of a potential security threat.

12. The computer system of claim 8, further comprising:
program instructions to alert the first user of a potential security threat by calculating a safety rating score based on respective safety ratings of one or more interested parties; and
program instructions to issue one or more notifications to the first user when the first user selects a trading party that has a calculated safety rating score below a predetermined threshold.

13. The computer system of claim 8, further comprising:
program instructions to enable the first user to selectively manage one or more knowledge corpora, wherein the first user can select to enable access to at least a portion of the knowledge corpus of the one or more knowledge corpora for AI exchange through the anonymous network.

14. The computer system of claim 8, further comprising:
program instructions to retrieve historical user data of the first user from a database; and
program instructions to create a user account for the first user based on the retrieved historical user data and interactions of the first user with the AI response system.

15. A computer program product for extracting test datasets for testing and resource optimization, the computer program product comprising:

one or more computer readable storage devices and program instructions stored on the one or more computer readable storage devices, the stored program instructions comprising:

program instructions to create, by an AI response system, a knowledge corpus based on retrieved data associated with a first user;

program instructions to execute, by the AI response system, a search to locate one or more matching knowledge corpora based on a request of the first user;

program instructions to identify, by an anonymous network, at least one cluster of one or more anonymous second users having respective search requests that substantially match the search request of the first user;

program instructions to execute an AI exchange between the identified one or more anonymous second users and the first user; and program instructions to mature the knowledge corpus, via the AI response system, based on the AI exchange between the first user and the identified one or more anonymous second users.

16. The computer program product of claim 15, further comprising:

program instructions to receive, by a user interface or microphone, user dialog or user text data input; and program instructions to receive real-time user interaction data, wherein receiving the real-time user interaction data comprises: receiving user dialog from a microphone, or a transcript or text data of a dialog of a user from at least one of: a deep learning framework, a natural language processor (NLP), a natural-language understanding (NLU) neural network, and one or more cognitive toolkits.

17. The computer program product of claim 15, further comprising:

responsive to having difficulty registering a voice command or request of the first user, program instructions to display, by a user interface, or providing an auditory notification by a speaker, a responsive notification to the first user that prompts the first user to clarify the voice command or request of the first user, wherein the responsive notification identifies the voice command or request of the first user and enables the first user to correct the voice command in the responsive notification through the user interface, or a microphone via voice dictation.

18. The computer program product of claim 15, further comprising:

program instructions to determine a selected trading party is secure, wherein the determining the selected trading party is secure comprises:

program instructions to display, by a smart query engine, a safety rating of one or more interested trading parties to the first user to alert the first user of a potential security threat.

19. The computer program product of claim 15, further comprising:

program instructions to alert the first user of a potential security threat by calculating a safety rating score based on respective safety ratings of one or more interested parties; and program instructions to issue one or more notifications to the first user when the first user selects a trading party that has a calculated safety rating score below a predetermined threshold.

20. The computer program product of claim 15, further comprising:

program instructions to retrieve historical user data of the first user from a database; and program instructions to create a user account for the first user based on the retrieved historical user data and interactions of the first user with the AI response system; and program instructions to enable the first user to selectively manage one or more knowledge corpora, wherein the first user can select to enable access to at least a portion of the knowledge corpus of the one or more knowledge corpora for AI exchange through the anonymous network.

* * * * *